Figure 3:
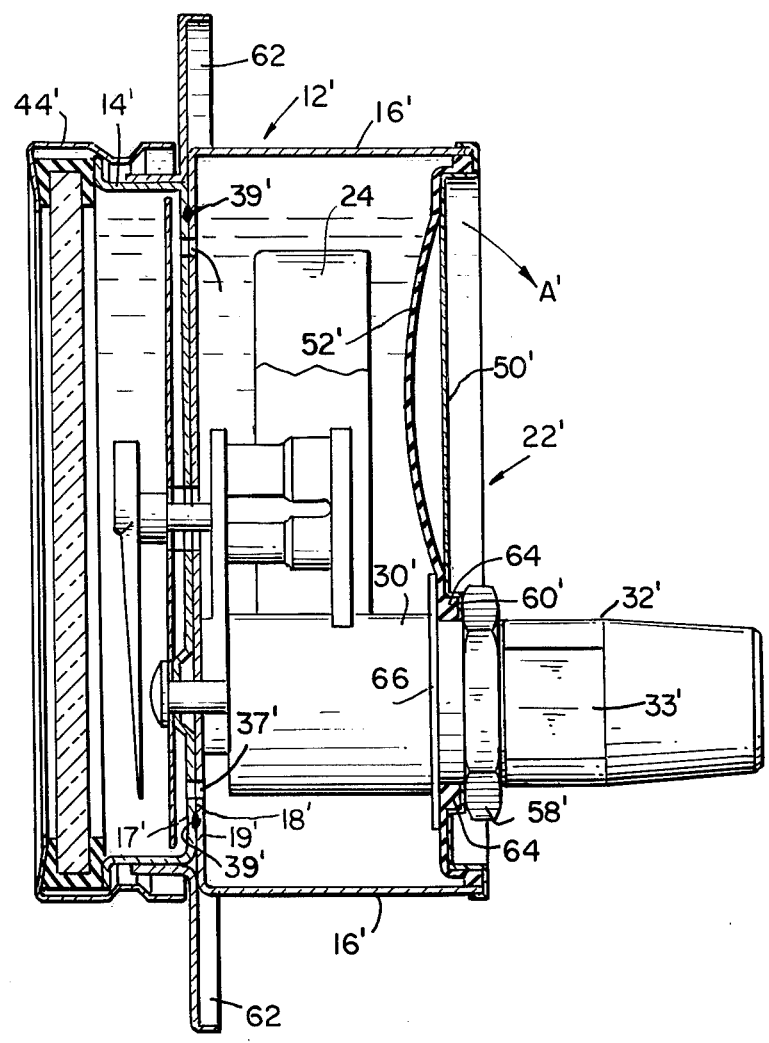

United States Patent [19]

Harland

[11] 4,175,444

[45] Nov. 27, 1979

[54] GAUGE ASSEMBLY

[75] Inventor: Philip W. Harland, Perkasie, Pa.

[73] Assignee: Ametek, Inc., Sellersville, Pa.

[21] Appl. No.: 932,517

[22] Filed: Aug. 10, 1978

[51] Int. Cl.$^2$ .............................................. G01L 19/06
[52] U.S. Cl. .................... 73/738; 29/157 R; 29/428; 73/431; 220/DIG. 29; 228/184
[58] Field of Search ............................ 73/732–743, 73/431; 220/DIG. 29; 29/157 R; 228/184

[56] References Cited

U.S. PATENT DOCUMENTS

| | | | |
|---|---|---|---|
| 1,366,214 | 1/1921 | Ritz-Woller | 73/431 |
| 2,471,704 | 5/1949 | Rose et al. | 73/431 |
| 2,527,095 | 10/1950 | Hare | 73/431 |
| 3,857,219 | 12/1974 | Bissell | 73/741 |

*Primary Examiner*—Donald O. Woodiel
*Attorney, Agent, or Firm*—Amster, Rothstein & Engelberg

[57] ABSTRACT

A gauge assembly is disclosed having a casing formed of two separate cup members joined together in back-to-back relationship so as to form a relatively thick partition wall within the casing. The wall acts to reduce the possibility of parts being projected forward toward an observer in the event the gauge actuating mechanism, which is located behind the partition wall in the casing, should fail.

6 Claims, 3 Drawing Figures

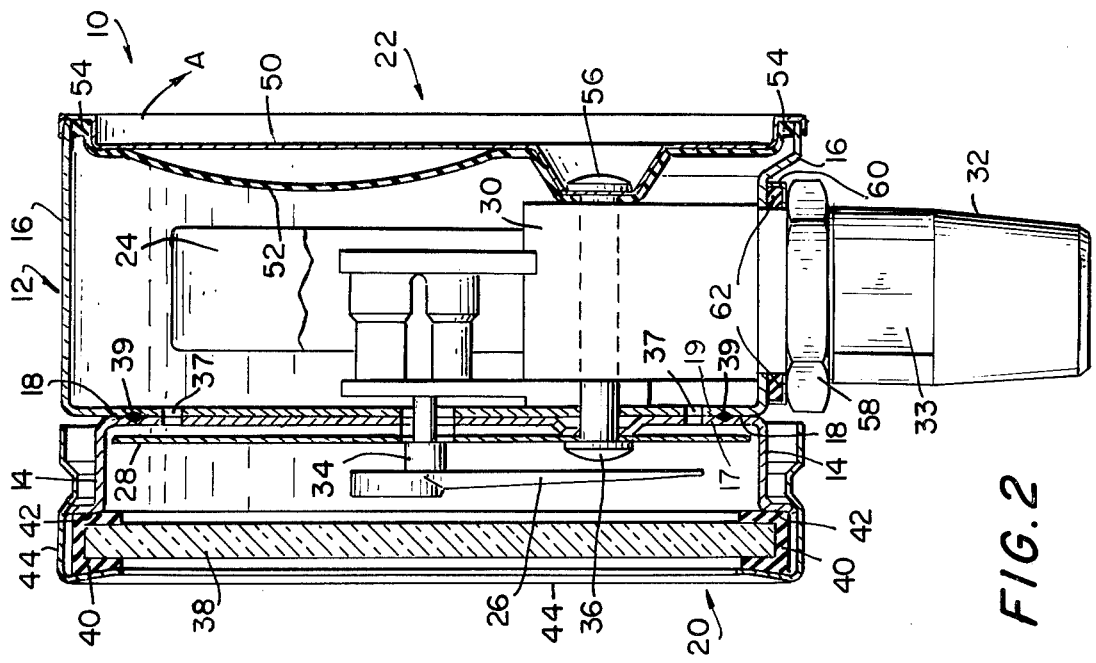
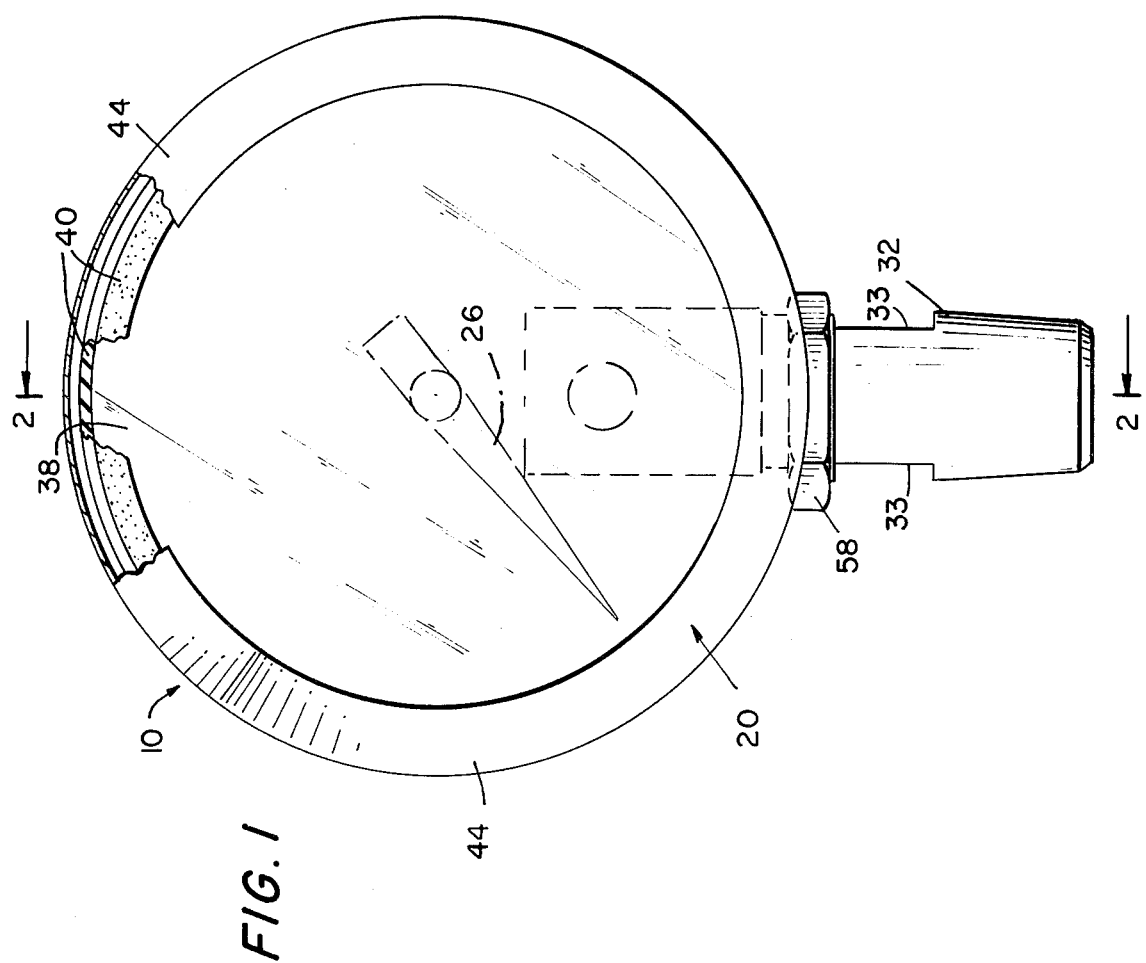

GAUGE ASSEMBLY

DESCRIPTION OF THE INVENTION

The present invention relates to gauges, and more particularly to pressure gauges including a solid front wall and which can be liquid filled.

Pressure gauges having a solid wall interposed between the pressure measuring element and the front window are known in the art, an example of such a gauge appearing in U.S. Pat. No. 1,192,574. Generally the cases of such gauges have been made from metal castings or plastic moldings in order to obtain the solid wall. It is advantageous from a cost standpoint to manufacture such cases from sheet metal stampings since thinner walls may be used than can be cast and, likewise, corrosion resistant materials such as stainless steel can be used which would be very expensive if a cast construction was employed. Up to this time, attempts to use stampings in the construction of these cases have taken the form of either a single stamping wherein the solid wall is necessarily the same thickness as the relatively thin side walls of the case. Alternatively, a separate solid wall of increased thickness is joined to a case formed of the thinner material. In either instance, expensive tooling, difficult forming operations and expensive assembly techniques are required.

It has also been found to be desirable to provide these solid wall gauges with the option of being liquid filled inside of the case for the purpose of providing vibration damping, continual lubrication of the gauge mechanism and protection from corrosive atmospheres. This requirement further complicates the construction of the cases since various sealing surfaces must be provided to contain the liquid.

Accordingly, it is an object of the present invention to overcome the above and other shortcomings in the prior art gauge assemblies.

It is another object of the present invention to provide a gauge construction which includes a relatively thick solid wall therein to reduce the possibility of parts being projected forward toward an observer in the event of a rupture of the gauge mechanism.

It is yet another object of the present invention to provide a solid wall gauge assembly which can be easily and readily fabricated.

It is still another object of the present invention to provide a solid wall gauge assembly suitable for either liquid filled or dry gauge applications.

It is yet another object of the present invention to provide a solid wall gauge assembly of simple, inexpensive construction and yet is readily adaptable to various mounting configurations.

It is yet another object of the present invention to provide a gauge assembly which can accommodate a variety of front bezel and window configurations with a minimal alteration of tooling.

It is still a further object of the present invention to provide a method for constructing a gauge with a minimal number of steps involving simple and inexpensive assembly techniques.

In accordance with a specific embodiment of the present invention, a gauge assembly comprises a casing which includes front and rear cup members. The cup members have respective end walls which are joined together to form a substantially solid partition wall within the casing. A condition responsive mechanism is disposed on one side of the partition wall and actuates an indicator disposed on the opposite side of the partition wall for indicating a measurement to be viewed by an observer. The solid partition wall also serves to reduce the possibility of parts being projected forward should the condition responsive mechanism rupture.

The present gauge assembly also preferably includes a rear cover wall which separates from the rear cup member when the internal casing pressure exceeds a given pressure level.

The above brief description, as well as further objects, features and advantages of the present invention will be more fully understood by reference to the following detailed description of the presently preferred, but nonetheless illustrative embodiments, in accordance with the present invention, when taken in conjunction with the accompanying drawings, wherein:

FIG. 1 is a partially broken front elevational view of a gauge assembly according to the present invention showing interior components thereof including an indicator on the front side of a solid partition wall and a pressure responsive mechanism on the other side of the wall;

FIG. 2 is a side elevational view, partly in section, taken substantially along line 2—2 of FIG. 1, showing front and rear cup members together forming the gauge casing and the partition wall, and the interior components of the present gauge assembly; and FIG. 3 is a view similar to that of FIG. 2, showing a second embodiment of the gauge assembly of the present invention including a mounting flange for panel installations of the present gauge assembly.

Referring now in detail to the drawings and particularly to FIGS. 1 and 2 thereof, in accordance with an illustrative embodiment demonstrating objects and features of the present invention, there is provided a gauge assembly generally designated by the reference numeral 10. As best seen in partial cross-section in FIG. 2, gauge assembly 10 includes a casing 12 formed of two cylindrical cup members 14 and 16 each having respective flat end walls 17 and 19. Cup members 14 and 16 are preferably separately formed by stamping of sheet metal materials such as stainless steel, brass or other like sturdy material. The cup members 14 and 16 are later joined together in back-to-back relationship so that their respective end walls 17 and 19 abut each other to form a substantially solid partition wall 18 intermediate the ends of the casing 12. The opened ends of the cup members 14 and 16 may be sealingly enclosed by a front viewing cover 20 and a rear cover 22, respectively.

It will be appreciated that the thickness of the partition wall 18 is equal to the combined thicknesses of the respective end walls 17 and 19. This is an important feature of the present invention as it enables a substantially solid and relatively thick protective wall to be formed within the casing 12 without incurring intricate fabrication methods and high material costs.

Disposed behind the partition wall 18 is a condition responsive mechanism, e.g., a Bourdon tube 24, which actuates an indicator 26 located in front of the wall 18. A dial plate 28 having unshown measurement markings thereon is preferably mounted against the front of partition wall 18 so that an observer can note the indicated measurements when viewing the gauge assembly 10 through the front cover 20.

Bourdon tube 24 is preferably mounted to a block 30 having passageways (unshown) for communicating fluid pressure to the tube 24 by way of a fluid coupling 32 sealing mounted to the casing rear cup member 16. In FIG. 2, the coupling 32 is shown as extending downwardly from rear cup member 16, and has a pair of wrench flats 33 formed on opposite sides thereof in parallel alignment with each other. In a second embodiment of the present invention, to be described later in connection with FIG. 3, fluid coupling 32 can be arranged to extend rearwardly of cup member 16.

In the event the present gauge assembly 10 is to be filled with liquid prior to use, it is important that the front viewing cover 20 and the rear cover 22 be joined to the respective cup members 14 and 16 in sealing relationship therewith and, further, that any openings in the partition wall 18, such as to allow passage of an indicator shaft 34 and a dial plate mounting screw 36 therethrough, be made liquid-tight relative to the exterior of the casing 12. It should be noted that a number of additional liquid communicating holes 37 should be provided through the wall 18 at selected locations to enable uniform filling of both cup members 14 and 16. Sealing of the wall openings is preferably carried out by welding the cup member end walls 17 and 19 together in one or more continuous rings as at 39 in order to encompass all of the openings through the wall 18, thereby preventing the liquid from seeping out between the end walls 17 and 19. If the gauge assembly 10 is not to be used liquid filled but "dry", it would then only be necessary to join the cup member end walls 17 and 19 by spot welding, for example, at several selected locations.

Turning now to further details of the gauge assembly 10, the front viewing cover 20 preferably includes a transparent glass or plastic faceplate 38. Faceplate 38 is preferably sealed about its outer edge by a conventional rubber gasket 40, as shown in FIGS. 1 and 2. The rearward surface of the gasket 40 is seated against an outwardly flared lip 42 formed on cup member 14 (FIG. 2). An outer bezel 44 is formed to forcibly seal against the forward surface of gasket 40 so as to maintain faceplate 38 stationary. The rearward portion of bezel 44 is preferably of "bayonet" construction to facilitate its insertion and removal over the front cup member 14 should servicing of the faceplate 38, indicator 26 or dial 28 become necessary.

The front viewing cover 20, shown in FIG. 2, is one of a number of various front cover arrangements which the present gauge assembly 10 can readily accommodate with only a minimal alteration of tooling. It will be appreciated that by a simple modification of the front cup member 14 from the particular shape shown in FIG. 2, the gasket 40 can be eliminated and the faceplate 38 seated directly against a step formed circumferentially about and within the open end of the cup member 14. A bezel such as 44 can then be placed over the faceplate to frictionally engage the outer edge of the front cup member and thereby steadily retain the faceplate against the formed step. Also, a one piece plastic viewing window can replace the entire front viewing cover 20, the window having a skirt extending rearwardly to pass over and securely engage the lip 42 as formed on the front cup member 14 in FIG. 2.

Turning now to details of the rear cover 22, this cover preferably includes an outer cover plate 50 which may have at least one vent hole therein (unshown), and a conventional flexible rubber gland 52 overlying and extending partially above the inside surface of the cover plate 50. Gland 52 operates to seal liquid filled in the gauge assembly 10 from escaping out from the joint 54 between cover plate 50 and the rearwardly facing opening of cup member 16, as well as through any vent holes in the plate 50. The rear cover 22 is maintained in sealing relationship with the cup member 16 by screw 56 which threadably engages an opening in the mounting block 30. Gland 52 also acts to seal the joint between screw 56 and cover plate 50.

The foregoing construction and arrangement of the rear cover 22 will allow it to separate from rear cup member 16 when the internal casing pressure exceeds a given level, which level may be set below that required to fracture the faceplate 38. In the embodiment shown in FIG. 2, this separation will occur at the upper portion of the rear cover 22 as indicated by the arrow A, the total force then applied against cover plate 50 through the gland 52 being sufficient to move the upper edge of plate 50 outwardly. Accordingly, pressurized liquid or gas within the gauge assembly 10 will be discharged to reduce the internal pressure level.

In the embodiment shown in FIG. 2, mounting block 30 has the fluid coupling 32 extending downwardly therefrom through an opening in the cup member 16. The block 30 and coupling 32 are fixedly secured with respect to the casing 12 by a threaded nut 58 which engages a collar 60 surrounding the bottom of the mounting block 30. Liquid within rear cup member 16 is prevented from leaking out about the collar 60 by way of a conventional rubber gasket 62 which is compressed between the collar 60 and rear cup member 16.

FIG. 3 illustrates a second embodiment of the present invention wherein components corresponding to those shown in FIGS. 1 and 2 are accorded like reference numerals.

The gauge assembly of FIG. 3 is intended for applications in which the assembly is to be mounted against a supporting surface such as a display panel. Accordingly, a front mounting flange 62, which may also be formed of stamped sheet metal, is spot welded or otherwise joined to the outer surface of the front cup member 14', as shown. To facilitate construction of the present gauge assembly, mounting flange 62 should be attached to the front cup member 14' before front cup member 14' is joined to rear cup member 16'. The outer diameter of the front cup member body may therefore be less than that of the rear cup member body so that bezel 44' can lie flush with the rear cup member 16', as shown. Such latitude in the overall configuration of the present gauge assembly allows for conformity to European standards for the outer diameter of the casing 12' and the mounting flange bolt circle, as well as for an improved appearance.

Also, in panel mount applications, it is desirable that the gauge fluid coupling 32' extend rearwardly from the gauge casing 12'. Accordingly, collar 60' which is formed as part of cover plate 50' is positioned to surround the rear mounting block 30' which extends through an opening in rear cover 22', the mounting block 30' and fluid coupling 32' being secured to the rear cover 22' by threaded nut 58'. It will be noted that rubber gland 52' preferably includes an enlarged liquid sealing ring 64 about an opening therethrough, this ring being compressed between the collar 60', and a flat ring 66 surrounding the mounting block 30', when nut 58' is tightened. The upper portion of the rear cover 22' is also arranged to separate from the upper edge of the rear cup member 16' upon a rise in pressure within casing 12', as in the embodiment of FIG. 2.

From all of the foregoing, it will be appreciated that the gauge assembly according to the present invention enables a number of significant advantages to be realized in terms of ease of manufacture, safety and versatility, which were not obtained with the known prior gauge constructions.

As will be readily apparent to those skilled in the art, the present invention may be realized in other specific forms without departing from its spirit or essential characteristics. For example, although the present gauge assembly is particularly suited for liquid filled applications, it will also prove to be highly satisfactory when used in "dry" form. As the condition responsive mechanism is located behind the solid wall therein, the shielding effect of the wall is always present to prevent parts behind the wall from being projected forward in the event of a rupture of the mechanism. Also, in "dry" type installations, the rear cover need not be sealed by the gland 52 as in liquid filled applications, or alternatively, one or more ventilation holes may be provided at selected locations through the gauge casing rather than in the cover plate 50.

The present embodiments are, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. A gauge assembly comprising a casing adapted to be liquid filled during operation of said assembly, said casing including front and rear cup members joined together to form a partition wall therein, front and rear covers for sealingly enclosing said front and rear cup members at their opened ends, respectively, said rear cover being constructed and arranged to separate from said rear cup member when the pressure of said liquid within said casing exceeds a given level, indicator means disposed within said front cup member for indicating a physical condition to be measured, and condition responsive means disposed within said rear cup member and coupled to actuate said indicator means in corresponding relationship to said physical condition.

2. A gauge assembly according to claim 1, wherein said rear cover includes a rubber gland on the inner surface thereof.

3. A gauge assembly adapted to contain a liquid substance capable of being evenly dispersed throughout said assembly to communicate with component parts of said assembly during operation thereof, comprising, a casing formed of front and rear stamped cup members each having a substantially flat end wall, respectively, each of said end walls having at least one opening location provided therein, said cup members being positioned with their end walls in contiguous relationship so that the opening location on one end wall is in registry with the opening location on the other end wall, said end walls forming a relatively thick partition wall within said casing but enabling said liquid substance to pass through the openings provided in said end walls to uniformly fill both of said cup members, said cup members being joined together to prevent said liquid substance from escaping between said cup members, front and rear covers for sealingly enclosing said front and rear cup members at their opened ends, respectively, said rear cover being constructed and arranged to separate from said rear cup member when the pressure of said liquid within said casing exceeds a given level, an indicator disposed within said front cup member for indicating a physical condition to be measured, and means responsive to the condition to be measured disposed within said rear cup member and coupled through said partition wall to said indicator to control said indicator in response to said physical condition.

4. A gauge assembly according to claim 3, wherein each of said end walls has a plurality of liquid openings provided therein at selected locations, said cup members being joined together with a continuous weld encompassing all of said openings.

5. A gauge assembly according to claim 3, wherein each of said end walls has a plurality of liquid openings provided therein at selected locations, and the cup members are joined together with a plurality of continuous welds which together encompass all of said liquid openings.

6. A method for constructing a gauge assembly adapted to contain a liquid substance capable of being evenly dispersed throughout said assembly to communicate with component parts of said assembly during operation thereof, comprising the steps of forming separately stamped front and rear cylindrical cup members each having a substantially flat end wall, respectively, positioning said cup members with their end walls in contiguous relationship thereby forming a relatively thick partition wall within said assembly, said partition wall having at least one liquid opening therein to enable said liquid substance to pass therethrough and uniformly fill both of said cup members, joining said cup members together with a continuous weld which encompasses at least one said opening so that said liquid substance is prevented from escaping between said cup members, and providing front and rear covers for sealingly enclosing said front and rear cup members at their opened ends, respectively, said rear cover being operative to separate from said rear cup member when the pressure of said liquid within said assembly exceeds a given level.

* * * * *